UNITED STATES PATENT OFFICE.

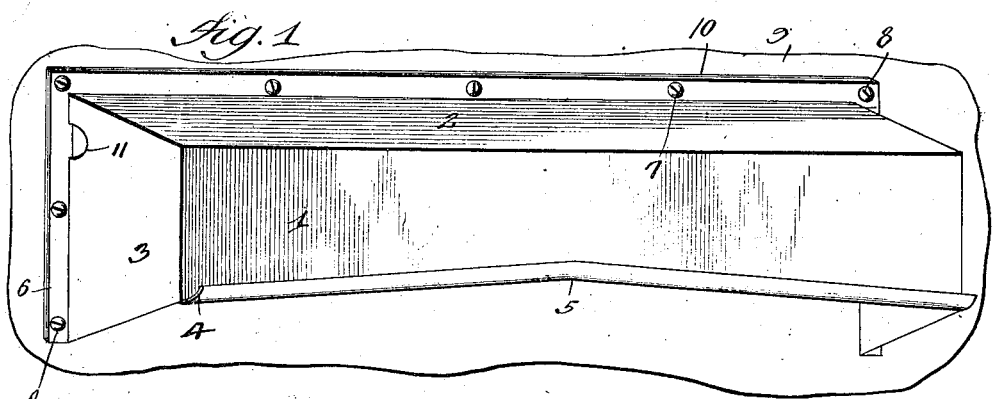
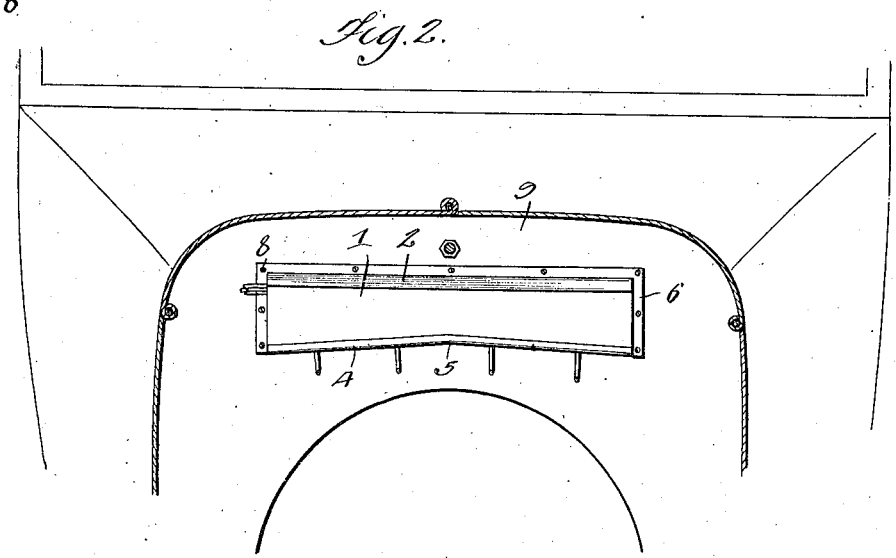
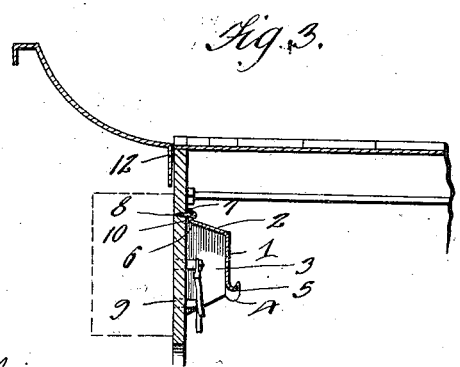

LORENZ C. SCHULZ, OF DETROIT, MICHIGAN.

MOTOR-SHIELD.

1,297,253.    Specification of Letters Patent.    Patented Mar. 11, 1919.

Application filed August 16, 1918. Serial No. 250,178.

*To all whom it may concern:*

Be it known that I, LORENZ C. SCHULZ, a citizen of the United States, residing at Detroit, in the county of Wayne and State of Michigan, have invented new and useful Improvements in Motor-Shields, of which the following is a specification.

This invention relates to motor shields or protectors, the object in view being to produce a protecting device applicable to the engine equipment of an automobile for the purpose of preventing water and excessive moisture from obtaining access to the ignition apparatus of the engine and causing a short circuit at any one of a number of points which would result in stopping the engine and preventing the starting of the same until such moisture was evaporated and the parts of the ignition apparatus rendered dry.

A further object of the invention is to produce a device of the character referred to which may be easily applied to an automobile without the services of a skilled mechanic and within a short space of time and which may be also economically placed upon the market.

With the above and other objects in view, the invention consists in the construction, combination and arrangement of parts, as herein described, illustrated and claimed.

In the accompanying drawings:

Figure 1 is a perspective view of the shield or protector.

Fig. 2 is a vertical transverse section through the motor compartment of an automobile looking rearwardly toward the shield or protector, which is shown in its applied relation to the machine.

Fig. 3 is a vertical longitudinal section through the same.

The protector is in the form of an elongated hood, the same being elongated transversely of the motor compartment of an automobile, and comprising a front wall 1 which is substantially vertical, a top wall 2 which is forwardly inclined or sloping, so as to shed the water, and end walls 3 which prevent water from being driven in at the ends of the shield or protector.

At the bottom of the front wall 1 of the shield or protector there is a gutter or trough 4 which extends throughout the length of the protector and is centrally crowned or elevated as shown at 5 so that any water received in the trough will flow by gravity toward the opposite sides of the engine compartment and drain exteriorly of the hood, the water thus being prevented from falling upon any portion of the ignition apparatus of the engine.

The protector, as a whole, is provided along its top and side edges with an attaching flange 6 formed with holes 7 to receive fasteners 8, such as screws, by means of which the protector is fastened to the dash board 9 of the vehicle. A gasket 10 of felt or other suitable flexible and compressible material is interposed between the flange 6 and the dash board to exclude water at that point. One of the end walls 3 is formed with a notch or opening 11 for the passage of the commutator wires. A packing strip or gasket 12 of felt or other flexible and compressible material is inserted between the cowl and the dash of the vehicle as shown in Fig. 3, so as to exclude water at that point. By means of the construction and arrangement hereinabove described, any water falling upon the inclined upper surface of the cowl of the machine, is caught by the gutter 4 of the protector, and directed laterally toward the sides of the motor compartment, so that said water will not drip or fall upon any portion of the ignition apparatus of the engine, such apparatus being therefore, maintained in a dry or a working condition in a driving rain. The device may be manipulated cheaply, out of sheet metal of any kind and may be readily applied by the average non-skilled mechanic in a short space of time.

I claim:—

1. The combination with the dash of a motor vehicle, of a protector fastened to the front of the dash and comprising an imperforate forwardly sloping top wall, a substantially vertical front wall, end walls, and a central crowned gutter projecting forwardly from the bottom of said front wall and sloping in opposite directions toward the ends of the protector.

2. The combination with the dash of a motor vehicle, of a protector fastened to the front of the dash and comprising an imperforate forwardly sloping top wall, a substantially vertical front wall, end walls, and a central crowned gutter projecting forwardly from the bottom of said front wall and sloping in opposite directions toward the ends of the protector, said protector comprising an attaching flange extending along the top and end portions thereof.

In testimony whereof I affix my signature.

LORENZ C. SCHULZ.